United States Patent [19]

Erkfritz

[11] 4,294,565
[45] Oct. 13, 1981

[54] INDEXABLE FINISHING INSERT FOR A MILLING CUTTER

[75] Inventor: Donald S. Erkfritz, Clarkston, Mich.

[73] Assignee: General Electric Company, Columbus, Ohio

[21] Appl. No.: 127,598

[22] Filed: Mar. 6, 1980

[51] Int. Cl.³ .............................................. B26D 1/12
[52] U.S. Cl. ...................................... 407/113; 407/62
[58] Field of Search ............................ 407/62, 113, 114

[56] References Cited
U.S. PATENT DOCUMENTS

| | | | |
|---|---|---|---|
| 3,279,034 | 10/1966 | Kaiser | 407/113 |
| 3,279,035 | 10/1966 | Johnson | 407/113 |
| 3,434,190 | 3/1969 | Kaiser | 407/113 |
| 3,551,978 | 1/1971 | Berry, Jr. | 407/113 |
| 3,670,380 | 6/1972 | Moore et al. | 407/113 |
| 3,742,565 | 7/1973 | Boboltz et al. | 407/113 |
| 3,762,005 | 10/1973 | Erkfritz | 407/114 |
| 3,927,447 | 12/1975 | Willinger | 407/113 |
| 4,180,355 | 12/1979 | Nanini | 407/113 |

Primary Examiner—Harrison L. Hinson
Attorney, Agent, or Firm—Morgan, Finnegan, Pine, Foley & Lee

[57] ABSTRACT

An indexable finishing insert is disclosed formed from a flat wafer of cutting material having front and rear planar rake surfaces and a plurality of edge faces disposed therebetween. The rake faces are generally of equilateral, polygonal configuration with the side edges thereof corresponding to the cutting edges of the insert. The cutting edges are arcuate and have a radius of curvature several times greater than the width of the planar surfaces. The intermediate portion of each edge face is substantially planar and defines a locating land for facilitating the mounting of the insert within the pocket of a milling cutter. At least a portion of the opposed ends of each edge face is curved and sloped away from the front rake surface in order to provide clearance along the edge faces when the insert is mounted on a cutting tool at an angle between the rake surfaces and the workpiece.

14 Claims, 13 Drawing Figures

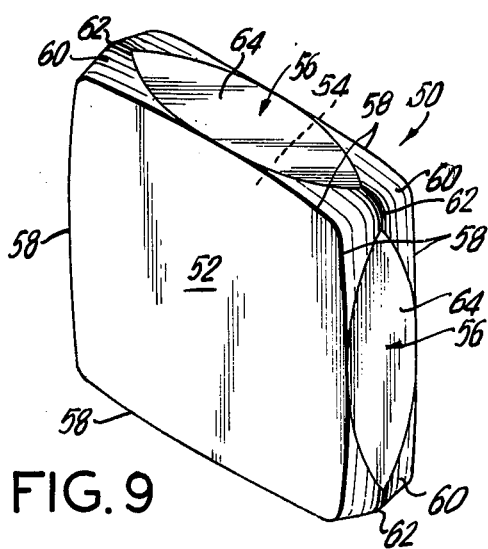
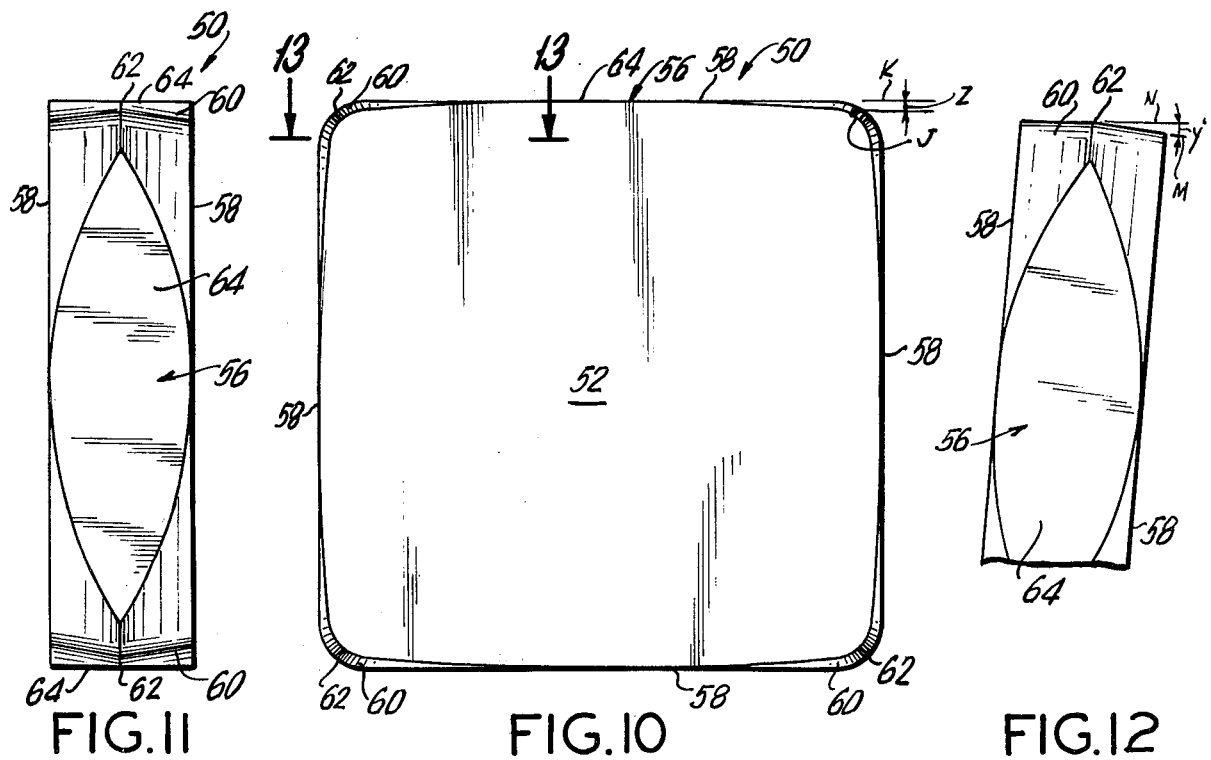
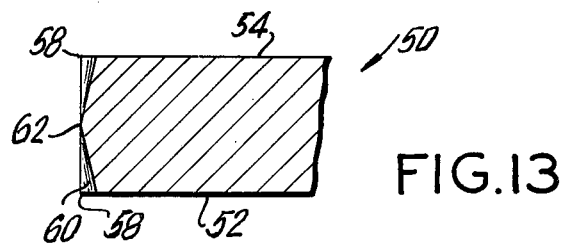
FIG. 9
FIG. 11  FIG. 10  FIG. 12
FIG. 13

INDEXABLE FINISHING INSERT FOR A MILLING CUTTER

The subject invention relates to an indexable finishing insert for use in a milling cutter tool. More particularly, a finishing insert is disclosed having curved cutting edges to provide an accurate finishing cut in a workpiece. The front and rear rake surfaces of the new and improved finishing insert of the subject invention are planar in configuration and thus maintain the structural integrity of the insert. Further, the mounting of the insert is facilitated by both the planar configuration of the rake surfaces, as well as by the inclusion of planar locating lands on each of the edge faces of the insert.

BACKGROUND OF THE INVENTION

Indexable inserts, formed from a hardened material are used in conjunction with cutting tools in milling operations when machining cast iron, aluminum or steel parts. To provide for smooth, high quality cutting profiles, finishing inserts have been developed which have elliptical cutting edges. An elliptical cutting edge allows for the removal of an extremely thin, tapered chip of metal leaving a cut surface which is rounded and smoothed. Typical examples of the finishing inserts found in the prior art are disclosed in U.S. Pat. No. 3,279,034, issued on Oct. 18, 1966 to Kaiser for an "Indexable Cutting Blade"; U.S. Pat. No. 3,434,190, issued on Mar. 25, 1969 to Kaiser, for an "Indexable Cutting Blade"; and U.S. Pat. No. 3,762,005, issued on Oct. 2, 1973 to Erkfritz, for an "Indexable Cutting Insert". These patents disclose indexable inserts, having a cutting edge which is elliptically curved. More specifically, the patents to Kaiser disclose finishing inserts where the rake faces of the inserts are altered to provide a curved cutting edge. The earlier patent to Kaiser alters the front rake face of the insert by curving its outer edges to conform to the surface of an imaginary sphere. The latter Kaiser patent discloses an insert wherein the rake face is grooved to define a curved cutting edge. Similarly, the patent to Erkfritz discloses a finishing insert having grooves undercut along the length of each rake surface.

The indexable inserts disclosed in the prior art were useful in providing finishing type cuts in a workpiece when used in conjunction with a milling tool. However, the changes necessary to alter a standard insert to an elliptical finishing insert resulted in the reduction of the integrity of the rake face of the insert. More particularly, the rounding of the rake face of the insert, or the addition of grooves thereto, for defining the elliptical cutting edges of the insert, effectively reduced the thickness of the insert thereby resulting in a loss of structural strength along the cutting edges. These changes also effectively reduced the surface area of the locating lands which were provided on the edge faces of the inserts. The locating lands were provided to facilitate clamping of the insert within the pocket of a cutter body and serve to locate the inserts in a precise position relative to the body thereby creating the desired axial and radial rake angles.

In addition to the above shortcomings of the prior art systems, it is noted that when these prior art inserts having modifications designed to produce elliptical cutting edges were inserted into a pocket of a milling cutter, the effective geometry of the pocket was altered such that the desired rake angle was not achieved.

Accordingly, it is an object of the subject invention to provide an indexable finishing insert including planar front and rear rake surfaces which provide for the improved structural integrity of the insert.

It is a further object of the subject invention to provide an indexable finishing insert wherein each edge face thereof includes a planar locating land to facilitate the mounting of the insert in the pocket of the cutter body.

It is another object of the subject invention to provide an indexable finishing insert having improved rake face and locater integrity, and in addition, does not alter the rake geometry inherently built into the insert pockets of milling cutters.

It is still a further object of the subject invention to provide an indexable finishing insert having either a positive or a negative geometry.

SUMMARY OF THE INVENTION

In accordance with these and other objects of the subject invention, an indexable finishing insert is provided for use with a milling cutter. The subject insert comprises a flat wafer of cutting material such as a hardened tungsten carbide, having parallel, spaced front and rear planar rake surfaces and a plurality of edge faces disposed therebetween. The rake faces are formed in an equilateral, polygonal configuration and in the preferred embodiments are square. The side edges of at least one of the square rake surfaces correspond to the cutting edges of the insert, and are arcuate in configuration having a radius of curvature which is several times greater than the width of the planar surface of the insert. The arcuate curvature of the cutting edges, which defines a drop at the corners of the insert, allows the insert to be used for finishing purposes. More specifically, a corner drop is provided which corresponds to the spacing between the end points of the cutting edges and an imaginary line tangent to the midpoint of the arcuate cutting edge. This arrangement allows the insert to be used for machining tapered cuts, resulting in a smooth, flat finish for the workpiece.

The intermediate portion of each edge face of the subject insert is substantially planar and defines a locating land to facilitate the clamping of the insert in the pocket of the milling cutter. The location of the planar lands corresponds to the location of the edge faces of a standard insert such that when the insert is mounted in a milling cutter, the inherent geometry of the insert pocket does not have to be altered. In order to provide clearance along the edge faces, the opposed ends or corner portions of the edge faces are contoured and slope away from the cutting edge. The configuration of the contoured corner portions of the edge faces is determined by the particular geometry of the insert, as well as the particular geometry of the insert pocket of the milling cutter. The indexable insert of the subject invention may be adapted for use with both positive and negative clearance angle geometries.

DESCRIPTION OF THE DRAWINGS

FIG. 9 is a perspective view of a second embodiment of the finishing insert of the subject invention.

FIG. 10 is a front elevational view of the second embodiment of the finishing insert of the subject invention.

FIG. 11 is a side elevational view of the second embodiment of the finishing insert of the subject invention.

FIG. 12 is a partial side elevational view of the second embodiment of the finishing insert of the subject invention, illustrating the slope at the corner portions of the edge face.

FIG. 13 is a partial sectional view of the second embodiment of the finishing insert of the subject invention, taken along line 13—13 of FIG. 10.

DESCRIPTION OF THE PREFERRED EMBODIMENTS

Figure 1:
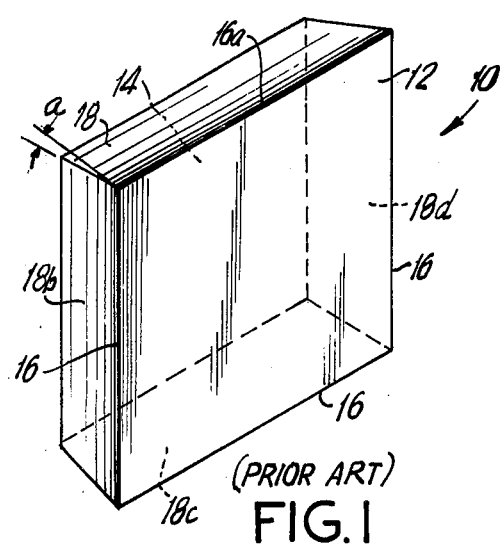
FIG. 1 is a perspective view of a standard, positively cleared, indexable insert of the prior art.

Referring now more particularly to FIG. 1, a standard prior art indexable insert is illustrated and is indicated generally by the numeral 10. The insert 10 is formed of a flat wafer of cutting material, usually a hardened tungsten carbide, and includes opposed front and rear planar rake surfaces 12, 14. The side edges 16 of the front planar surface 12 correspond to the sharpened, cutting edges of the insert. A plurality of generally trapezoidal edge faces 18 are formed between the opposed rake surfaces 12, 14 and are disposed at an acute angle relative to a plane normal to the planar surfaces of the insert 10. More specifically, the dimensions of the front rake surface 12 are larger than the dimensions of the rear rake surface 14 such that each edge face 18 slopes inwardly from the front rake surface 12 to the rear rake surface 14. The angle of the edge faces is provided to allow clearance therealong when the insert is mounted in a pocket of a cutter body having a positive axial rake geometry. More particularly, the prior art insert 10, as illustrated in FIG. 1, would generally be used in conjunction with a milling cutter (not shown) having a pocket geometry which results in a positive rake angle between the front planar surface 12 and the workpiece. By inwardly angling the edge faces 18 of the insert an amount greater than the positive rake angle, clearance may be provided along the edge faces, as is well known in the prior art. As illustrated in FIG. 1, the edge faces are sloped away from a plane normal to rake surfaces 12, 14 at an angle "a" of about 11°. By this arrangement, when the prior art insert 10 is mounted in a pocket of a milling tool having a positive rake geometry, only the cutting edges 16 and not the edge faces 18 will contact the workpiece.

Prior art insert 10 is usually clamped into the pocket body, along the front and rear rake surfaces 12, 14, such that one cutting edge 16 is disposed in an active cutting position. Further, if for example, cutting edge 16a is in the active position, the insert may be additionally clamped and supported along the inactive edge faces 18b, 18c, and 18d. By using the edge faces 18 for additional support, the maintenance of the desired rake angles of the insert within the pocket body is facilitated. The prior art insert 10 is used to form grooved cuts in a workpiece. However, the grooved cuts milled by this insert tend to be uneven and irregular, especially adjacent edges of the insert.

Figure 2:
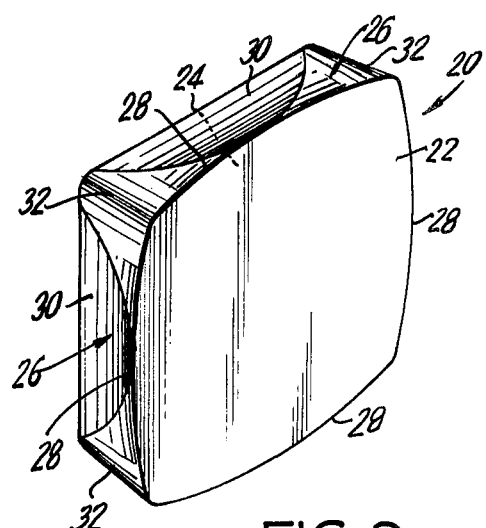
FIG. 2 is a perspective view of an indexable finishing insert in accordance with the subject invention.

Turning to FIG. 2, in accordance with the subject invention, a new and improved indexable finishing insert 20 is provided having arcuate cutting edges which are capable of creating smooth finishing cuts, and which insert is of high structural integrity. Further, the new and improved insert 20 does not alter the pocket geometry of a milling cutter when mounted therein.

The indexable finishing insert 20 is preferably formed from a hardened tungsten carbide material and has a flat wafer configuration including parallel, spaced front and rear planar rake surfaces 22 and 24. A plurality of trapezoidal edge faces 26 are disposed therebetween with at least the intermediate portions thereof corresponding to the inclined planar surfaces 16 of the indexable insert of the prior art, as more fully described hereinafter.

Figure 3:
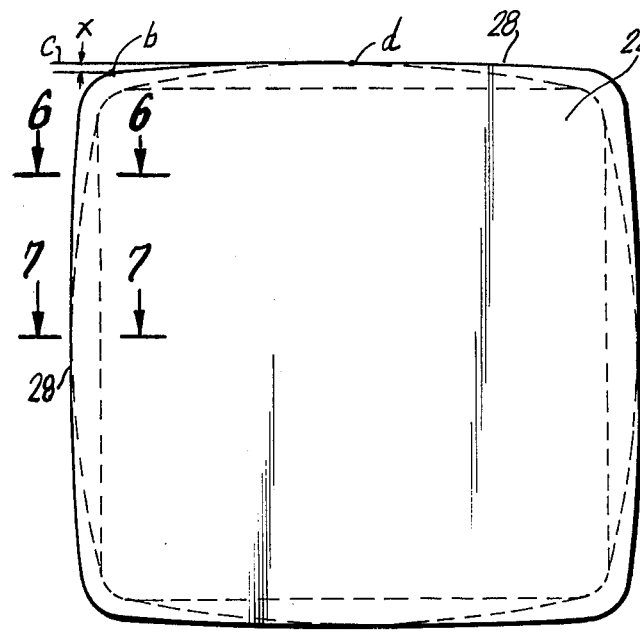
FIG. 3 is a front elevational view of the finishing insert of the subject invention.
Figure 8:
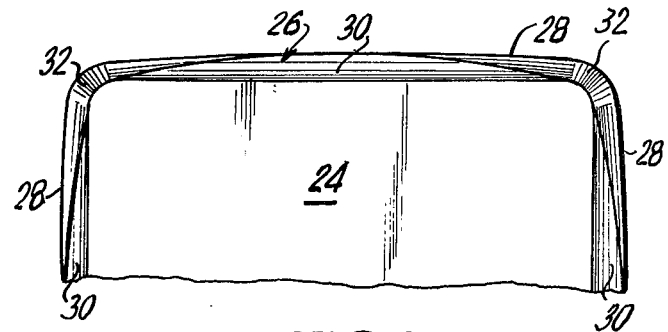
FIG. 8 is a partial, rear elevational view of the finishing insert of the subject invention.

As more clearly illustrated in FIGS. 3 and 8, the front planar surface 22 has dimensions slightly larger than the dimensions of the rear planar surface 24 such that the edge faces 26 are trapezoidal in configuration and are inwardly angled to provide clearance therealong when the insert is mounted in a milling tool having a positive rake geometry. The four side edges 28 of the front rake surface 22 correspond to the sharpened cutting edges of the insert 20. As illustrated in FIG. 3, the cutting edges are arcuate in configuration and have a radius which is several times greater than the width of the insert. The arcuate curvature of the cutting edges 28 functions to define a drop "x", at the corners of the insert. As illustrated in FIG. 3, the corner drop "x" corresponds to the spacing between a point "b" at the end of the cutting edge 28, and a line "c" which is tangent to the midpoint "d" of the cutting edge 28. In the preferred embodiment of the subject invention, wherein the insert has a width of approximately 0.75 of an inch, it is preferable that a corner drop "x" of 0.003 to 0.006 of an inch, be provided.

Figure 4:
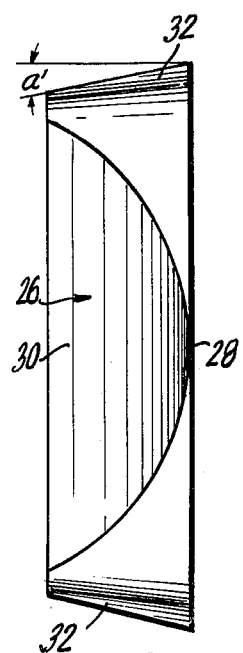
FIG. 4 is a side elevational view of the finishing insert of the subject invention.

In accordance with the subject invention, each edge face 26, as illustrated in FIGS. 2 and 4, is provided with a planar, locating land 30 and opposed, contoured corner portions 32. To achieve this arrangement, the opposed ends of the edge faces of the insert are configured to allow for adequate clearance therealong during a milling operation. More specifically, a clearance angle "y" must be provided at the opposed corner portions 32, as measured from the end points "b" of each cutting edge 28 to the rear rake surface 24. The amount of slope or clearance angle "y" of the end portions 32 of the edge faces 26 is determined by the geometry of the insert, as well as the pocket geometry of the milling cutter, as more fully described hereinafter.

The planar land 30 of the subject insert 20 corresponds to the edge face 18 of the insert 10 of the prior art. More particularly, to form the edge faces 26 of the subjec invention, only the corner portions 32 are modified while the intermediate portion remains unaltered. With conventional pocket geometries at least 70% of the edge faces 26 may be left unaltered. The new and improved finishing insert 20 of the the subject invention is thereby provided with edge faces 26 having a substantially unaltered portion such that the insert 20 may be securely clamped in the insert pocket of a milling cutter along both the planar front and rear rake surfaces 22 and 24 and along the flat planar locating lands 30. Thus, by maintaining the planar configuration of the rake faces 22, 24, as well as the locator integrity of the edge faces 26, an insert capable of making finishing cuts may be mounted on a milling cutter in a manner similar to the prior art inserts such that the inherent pocket geometry of the cutter is unaltered.

Figure 6:
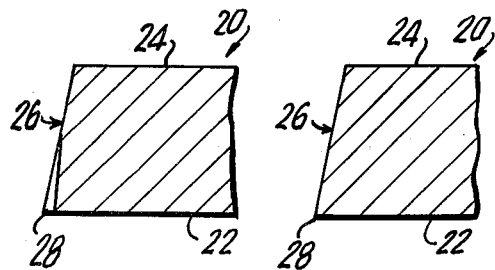
FIG. 6 is a partial sectional view of the finishing insert of the subject invention, taken along the line 6—6 in FIG. 3.
Figure 7:
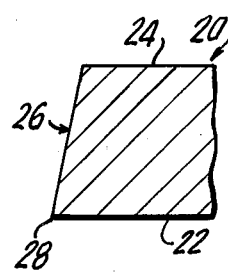
FIG. 7 is a partial sectional view of the finishing insert of the subject invention, taken along line 7—7 in FIG. 3.

FIGS. 6 and 7 are provided to illustrate the configuration of the edge faces 26 of the subject invention. While the partial cross-sectional views illustrate only one edge face, it is to be understood that the subject indexable insert is symmetrically arranged such that each edge face is identical in configuration. FIG. 6, which illustrates the configuration of the edge face 26 at a point adjacent the corner of the insert, indicates the slope along the corner portion 32 of the edge face 26. FIG. 7, a cross-sectioned view taken at the midpoint of the cutting edge 28, illustrates that a portion of the locating land 30 extends to the midpoint. As illustrated in FIG. 4, the configuration of the locating land 30 in this embodiment of the subject invention is semi-circular. The planar surface of the locating land 30 corresponds essentially to the surface of the edge face 18 of the prior art insert 10. Thus, the angle of inclination "a'" (FIG. 4) of the locating land 30 is preferably identical to the angle of inclination "a" of the edge face 18 of the prior art insert 10. In the illustrated embodiment, an 11° clearance angle is provided to allow the insert 20 to be mounted on a milling cutter with a conventional positive rake angle. More specifically, insert 20 is intended to be used in a milling cutter having a pocket geometry which provides for between 5° and 7° positive axial rake.

Figure 5:
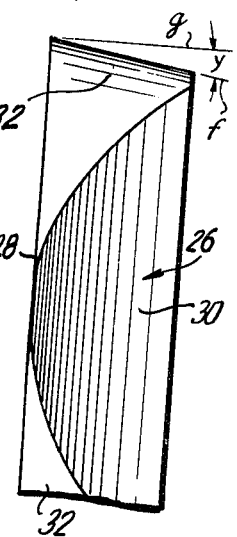
FIG. 5 is a partial side elevational view of the finishing insert of the subject invention, illustrating the slope at a corner portion of the edge face.

As noted above, the angle "a'" of the edge face 28 is sufficient to provide clearance therealong when the insert is provided with standard, straight cutting edges. However, when the insert is modified for finishing cuts, the portions of the opposed ends of edge faces adjacent the curved cutting edges are insufficiently cleared. Therefore, in accordance with the subject invention, the end portions 32 of the edge faces 26 are reduced or cleared away from each cutting edge 28 an amount sufficient to provide clearance along the entire edge face 26 during the cutting operation. It has been found that the slope of the edge portions 32 of the edge faces 26 must be at least 2° greater than the positive axial rake geometry of the milling cutter. As illustrated in FIG. 5, the amount of slope "y" at corner portions 32 of the edge faces is measured as the angle between the surface of the corner portion "f", and the plane "g" normal to the plane of the rake faces 12, 14. The insert 20 illustrated in FIGS. 2–8 is provided with a corner slope of approximately 9° such that it may be utilized in a conventional milling cutter having a pocket geometry of up to 7° positive axial rake. Thus, the new and improved arrangement of the edge faces 26 of the insert 20 permits the insert to be mounted with a positive axial rake while affording clearance along the entire edge face. The above disclosed arrangement is superior to the prior art inserts in that the structural integrity of both the front and rear sake surfaces is maintained and in addition, at least 70% of the edge faces are retained to act as locating lands 30, such that the insert may be securely clamped within the pocket of a milling cutter without altering its effective geometry.

Inserts can be modified in accordance with the subject invention for use with milling cutters having various pocket geometries. For example, should the positive insert 20 of the type illustrated in FIGS. 2–8 be used with a milling cutter having a less severe axial rake, the slope "y" and hence the amount of clearance along the edge faces 26 may be correspondingly reduced. When the amount of clearance is reduced, the area of the locating lands 30 will be increased thereby further facilitating the mounting of the insert.

As is apparent from the figures, the finishing insert 20 is symmetrically arranged such that it may be indexed to expose any one of the cutting edges 28 of the front rake surface 12 for active use. More specifically, when a single edge 28 becomes worn or dull through use, the insert may be unclamped and rotated 90° to expose a fresh, sharpened cutting edge. The insert may then be reclamped in the pocket body of the milling cutter for continued use.

Inserts having varying geometries may be modified in accordance with the subject invention. FIGS. 9–13 illustrate a second embodiment of the subject invention as used with a conventional 90° insert. More specifically, insert 50 is formed of a flat wafer of a tungsten carbide material and includes parallel spaced front and rear rake surfaces 52 and 54 of generally square configuration. A plurality of edge faces 56 are provided which are disposed perpendicular (90°) to the rake faces 52, 54. The insert 50 is intended for use in a milling cutter with a negative axial rake pocket geometry. In a conventional 90° insert, both the front and rear rake faces 52, 54 are symmetrical and provide cutting edges for the insert. More specifically, each rake face 52, 54 is provided with four sharpened edges 58 such that the insert has a total of eight sharpened edges 58.

In accordance with the subject invention, a standard 90° insert is modified for use as a finishing insert by providing each cutting edge 58 with an arcuate configuration, having a radius which is several times greater than the width of the planar surfaces. The arcuate configuration provides for a drop at the corners "z", to allow for a smooth finishing cut. The drop "z" is measured as the spacing between the end point "j" of the cutting edge 56 and an imaginary line "k", tangent to the midpoint of the cutting edge. In a standard insert having a width of 0.75 of an inch, a drop "g" of 0.003 to 0.006 inches is desirable. To provide adequate clearance along the edge faces 56, at least a portion of the opposed corner portions 60 of each edge face 56 are rounded or cleared. Since in this embodiment of the subject invention there are cutting edges 58 on both rake surfaces 52, 54, each corner portion 60 of the edge faces 56 are symmetrically cleared from the opposed rake surfaces to a midline 62. The clearance or slope "y'" at the corner portions 60 is illustrated in FIG. 12. The angle "y'" is measured between the surface "m" of the edge face 56 and a plane "n" normal to the plane of rake surfaces 52, 54. The insert 50 is intended to be used in a milling cutter having a negative rake pocket geometry. In the illustrated embodiment, a clearance angle "y'" of 2° is provided such that the insert 50 may be used in a milling cutter having a negative rake geometry of 4° or greater.

As noted above, rounding and sloping of the corner portions 60 provides clearance along the edge faces 56 of the insert 50. The unaltered intermediate portion of each edge face 56 defines a planar locating land 64 of a tapered, semi-elliptical configuration. The planar lands 64 correspond essentially to the edge faces of a standard 90° insert. Thus, the planar lands 64 may be used to facilitate the clamping of the insert in a milling cutter without altering its pocket geometry. Further, inasmuch as the insert 50 is essentially symmetrical and has eight cutting edges 58, the insert may be indexed to a position wherein any of the eight cutting edges 58 may be utilized to produce a finishing cut.

Accordingly, there is provided a new and improved finishing insert for use with an indexable cutting tool. More particularly, a finishing insert is provided formed from a flat wafer of cutting material having front and rear parallel, spaced planar rake surfaces and a plurality of edge faces disposed therebetween. Each rake face is of generally equilateral polygonal configuration, with the side edges of at least the polygonal front surface corresponding to the cutting edges of the insert. Each cutting edge is arcuate in configuration having a radius of curvature several times greater than the front rake surface. The intermediate portion of each edge face is substantially planar and defines a locating land to facilitate the clamping of the insert in the pocket of a milling cutter. In accordance with the subject invention, at least a portion of the opposed ends of the edge faces are curved and slope away from the front rake surface in order to provide clearance along the edge faces when the insert is mounted on a cutting tool at an angle between the front rake surface and the workpiece.

It is to be understood that changes may be made in the particular embodiments of the subject invention in light of the above teachings, but that these will fall within the full scope and spirit of the subject invention as defined by the appended claims.

I claim:

1. A finishing insert for use with an indexable cutting tool, said insert comprising:
a flat wafer of cutting material having parallel, spaced front and rear planar rake surfaces and a plurality of edge faces disposed therebetween, said rake faces being of equilateral, polygonal configuration with the side edges of said polygonal front rake surface corresponding to the cutting edges of said insert, said cutting edges being arcuate having a radius of curvature several times greater than the width of said front rake surface and with the intermediate portion of each said edge face being substantially planar and defining a locating land, with at least a portion of the opposed ends of said edge faces being curved and sloped away from said front rake surface in order to provide clearance along said edge faces when said insert is mounted on a cutting tool at a rake angle between said front rake surface and the workpiece.

2. A finishing insert as recited in claim 1 wherein said rake faces are generally square in configuration.

3. A finishing insert as recited in claim 2 wherein the dimensions of the square front rake surface are larger than the dimensions of the square rear rake surface, with each edge face being generally trapezoidal in configuration and inclined inwardly from said front rake surface to said rear rake surface at an acute angle relative to a plane normal to the planar rake surfaces.

4. A finishing insert as recited in claim 3 wherein said acute angle is equal to 11° whereby when said insert is mounted on a cutting tool creating a positive rake angle between said front rake surface and the workpiece, clearance is provided along said edge faces.

5. A finishing insert as recited in claim 4 wherein the slope of the opposed end portions of said edge faces is equal to an angle of approximately 9° relative to a plane normal to said rake surfaces.

6. A finishing insert as recited in claim 5 wherein said locating lands are semi-circular in configuration.

7. A finishing insert as recited in claim 6 wherein the drop at the end of each cutting edge, corresponding to the spacing between a point at the end of said cutting edge and an imaginary line tangent with the midpoint of said arcuate cutting edge, falls within the range of 0.003 to 0.006 of an inch.

8. A finishing insert as recited in claim 2 wherein the dimensions of said front and rear rake surfaces are substantially equal, with the planar locating lands, on the opposed edge faces, being substantially parallel and disposed perpendicular to said rake faces.

9. A finishing insert as recited in claim 8 wherein the side edges of said square rear rake surface correspond to additional cutting edges of the insert, with said additional cutting edges being arcuate having a radius of curvature several times greater than the width of said rear planar surface, with at least a portion of the opposed ends of said edge faces adjacent the additional cutting edges being curved and sloped away from said rear rake surface in order to provide clearance along said edge faces when said insert is mounted on a cutting tool at a rake angle between said rear rake surface and the workpiece.

10. A finishing insert as recited in claim 9 wherein the slope of the opposed end portions of said edge faces is equal to an angle of approximately 2° relative to a plane normal to the planar rake surfaces.

11. A finishing insert as recited in claim 10 wherein the drop at the ends of each cutting edge, corresponding to the spacing between a point at the end of the cutting edge and an imaginary line tangent to the midpoint of said arcuate cutting edge, falls within the range of 0.003 to 0.006 of an inch.

12. A finishing insert as recited in claim 11 wherein each said planar land is of generally tapered, elliptical configuration.

13. A finishing insert for use with an indexable cutting tool, said insert comprising:
a flat wafer of cutting material having parallel, spaced front and rear planar rake surfaces and a plurality of edge faces disposed therebetween, said rake faces being generally square in configuration, with the dimensions of the front rake surface being larger than the dimensions of the rear rake surface, and with each edge face being generally trapezoidal in configuration and inclined inwardly from said front rake surface to said rear rake surface at an acute angle relative to a plane normal to the planar rake surfaces, and wherein the side edges of said square front rake surface correspond to the cutting edges of said insert, each said cutting edge being arcuate having a radius of curvature several times greater than the width of said front planar surface, and with the intermediate portion of each said edge face being substantially planar and defining a locating land, with at least a portion of the opposed ends of said edge faces being curved and sloped away from said front rake surface, in order to provide clearance along said edge faces when said insert is mounted on a cutting tool at a rake angle between said front rake surface and the workpiece.

14. A finishing insert for use with an indexable cutting tool, said insert comprising:
a flat wafer of cutting material having parallel, spaced front and rear planar rake surfaces and a plurality of edge faces disposed therebetween and perpendicular thereto, said front and rear rake faces being of equal dimension and being generally square in configuration, with the side edges of each rake surface corresponding to the cutting edges of the insert, said cutting edges being arcuate having a radius of curvature several times greater than the width of said planar surfaces, and with the intermediate portion of each said edge face being substantially planar and defining a locating land, with at least a portion of the opposed ends of said edge faces being curved and sloped away from said rake surfaces in order to provide clearance along said edge faces when said insert is mounted on a cutting tool at a rake angle between said rake surfaces and the workpiece.

* * * * *